Nov. 11, 1969  H. WEBERS  3,477,627
SYNCHRONIZED RECIPROCATING FEED DEVICES
Filed Jan. 15, 1968
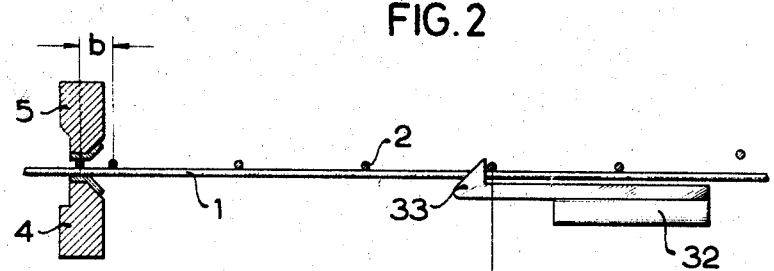
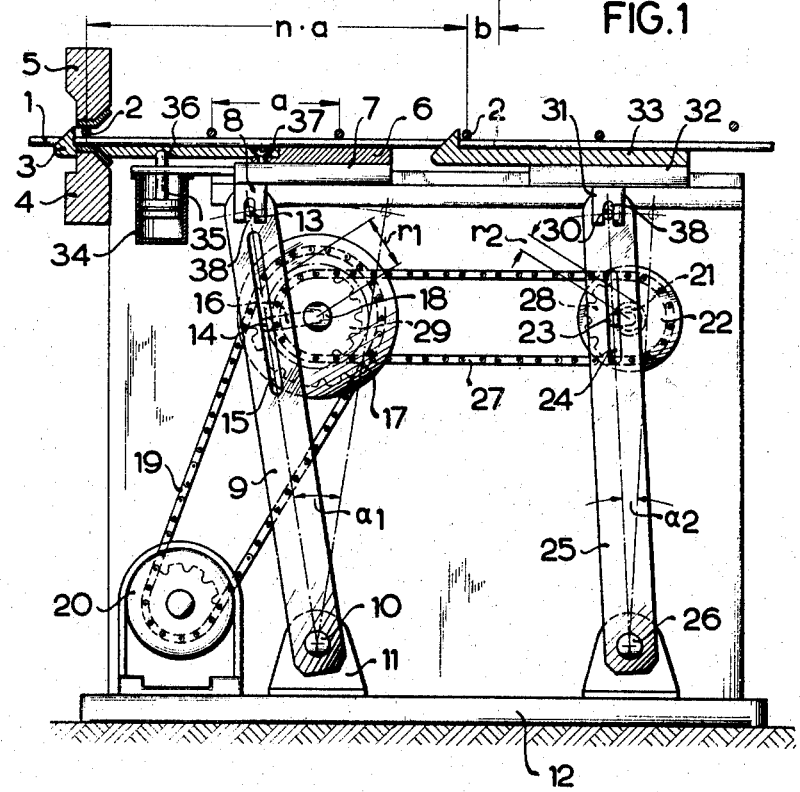
INVENTOR
Heinz WEBERS
By
*KARL RATH*
his ATTORNEY

United States Patent Office

3,477,627
Patented Nov. 11, 1969

3,477,627
SYNCHRONIZED RECIPROCATING FEED DEVICES
Heinz Webers, Osterath, Germany, assignor to Bau-Stahlgewebe GmbH, Dusseldorf-Oberkassel, Burggrafenstrasse, Germany, a corporation of Germany
Filed Jan. 15, 1968, Ser. No. 697,883
Claims priority, application Germany, Jan. 13, 1967, B 90,721
Int. Cl. B65h 17/36
U.S. Cl. 226—54       7 Claims

ABSTRACT OF THE DISCLOSURE

Intermittent work feeding apparatus comprises a pair of synchronously operated first and second reciprocating slides carrying first and second feet pawls engaging a workpiece, to feed the same in a common predetermined direction. The first slide is operated by a source of rotary power through a first rotary-to-oscillating motion conversion device, to feed the workpiece with a first predetermined feed stroke, while the second slide is operated through a second rotary-to-oscillating motion conversion device in synchronism with said first device, to feed the workpiece with a stroke being a fraction of said predetermined feed stroke. As a result, with both feed pawls engaging the workpiece, the latter is fed with said first feed stroke, while with said first pawl disengaged temporarily from the workpiece, the latter is fed with said second feed stroke, respectively.

---

The present invention relates to multiple-stroke intermittent work feeding apparatus for use especially, though not limitatively, in conjunction with the fabrication of concrete reinforcing steel mats comprised in a known manner of a set of spaced and parallel longitudinal bars intersected by a set of spaced and parallel transverse bars connected to said first set at the intersection points of the bars.

While the invention will be described in the following with specific reference to the fabrication of concrete reinforcing mats, it will become apparent that the improved feeding apparatus may be used with equal advantage in conjunction with the feeding of other workpieces being operated on in a continuous production line or manufacturing process.

It is customary in the fabrication of concrete reinforcing mats of the referred to type to feed the mats by means of reciprocating feed pawls driven by a rotary power source in the feed direction by an intervening oscillating arm and crank mechanism, said pawls intermittently engaging the transverse bars of the mats during successive operating or feed stroke cycles of the device.

Fabrication of concrete reinforcing mats is advantageously carried out by means of multiple spot welding machines in conjunction with feeding apparatus acting to advance the mats intermittently at the rhythm of the successive welding operations by distances equal to the spacing distance of the transverse bars. Aside from the use of semi-automatic welding machines involving the feeding of mat units with the transverse bars in pre-aligned position, fully automatic welding apparatus has become known involving the feeding of the longitudinal bars to the multiple-spot welding device in the form of continuous lengths of rods or wires supplied from a corresponding number of supply rolls or coils, the transverse bars being applied and welded intermittently to said longitudinal rods in a continuous manufacturing run or process. The thus obtained endless or strip-like mat structure is subsequently subdivided into appropriate length or mat units by means of a suitable cutting device, to provide final mat units of desired or standard size. Fully automatic multiple-spot welding apparatus in conjunction with continuous production line operation is advantageously employed where greater numbers of equal or standard mats are to be produced in large quantities both expeditiously and economically.

In feeding devices of the foregoing type which operate by advancing a mat between successive welding cycles by distances equal to the spacing distance between the transverse bars to be welded, it is customary to utilize a two-arm oscillating arm pivoted at an intermediate point and actuated at one end by a crank disk driven by a rotary power source, to cause the opposite end of the arm to oscillate within a predetermined angular range about its pivot axis. Said arm in turn serves to operate a reciprocating slide carrying a number of feed pawls or hooks adapted to engage one of the transverse bars of the mat to be fed during a feeding operation or cycle. Advantageously, the pawls or hooks engage the bar last welded in the course of a continuous fabricating run or process.

For reasons of economy, or in order to avoid wastage of material, it is necessary to keep the ends of the longitudinal bars of a mat unit projecting by a minimum distance beyond the outermost transverse bars of the unit. As a practical example, the projecting ends may have a length of about 25 mm.–50 mm., compared with a normal spacing distance between the transverse bars of about 200 mm.–250 mm. In the case of semi-automatic operation, involving the provision of definite lengths of longitudinal bars and pre-aligned transverse bars, maintenance of a minimum projecting length of the longitudinal bars presents no difficulties. With fully automatic manufacturing or welding devices, on the other hand, involving a continuous feeding of the longitudinal bars or wires, special means are required to effect an advance difference from the normal advance or feed stroke of the device, to enable cutting of the continuous or strip-like mat structure into appropriate lengths or units involving a minimum projecting length of the longitudinal bars.

With the known feed devices referred to in the foregoing, it is possible to vary the feed stroke by an adjustment of the distance of the pivot pin or joint of the oscillating arm from the crank operating upon one end of the arm. For this purpose, it is already known to displace, via a suitable drive or control, a rack which in turn causes the displacement, via a fork member, of the pivot pin, the latter being slidably disposed within a longitudinal guide slot of said arm. Although it is possible in this manner to control the feed stroke within limits in a relatively simple manner, an accurate an instant adjustment as required in conjunction with continuous production line operations is subject to great difficulties in practice. Besides, this kind of feed stroke control has been especially designed for use in conjunction with semi-automatic welding operations in the fabrication of reinforcing steel mats, where no necessity exists to vary the feed stroke during the actual welding operations. The prior feed stroke control is furthermore unsuited for continuous or automatic welding operations where it is desirable or necessary to vary the feed stroke substantially instantly by means of electrical, hydraulic, pneumatic or the like control devices or systems. In practice, such operation is required in connection with continuous welding or production line operation, making it necessary, for instance, to instantly change say from a normal (welding) stroke of 200 mm.–250 mm., corresponding to the spacing distance between the transverse bars, to a (cutting) stroke of say 25 mm.–50 mm., required for subdividing the continuous mat structure into desired standard units having minimum projecting lengths beyond the outermost transverse bars of the units.

Accordingly, an important object of the present invention is the provision of multiple-stroke work feeding apparatus of the referred to type by which the foregoing and related difficulties and drawbacks are susbtantially overcome or minimized, and which apparatus is both simple in design and construction as well as efficient and reliable in operation.

A more specific object of the invention is the provision of multi-stroke intermittent work feeding apparatus capable of susbtantially instant control of the feed stroke from one value to a different stroke or displacement of a workpiece being operated on.

The invention, both as to the foregoing and ancillary objects as well as novel aspects thereof, will be better understood from the following detailed description, taken in reference to the accompanying drawing forming part of this specification and in which:

FIG. 1 is a side view, shown partly in section, of an automatic welding device, embodying multiple-stroke work feeding means according to the invention, for the fabrication of concrete reinforcing mats, the device being shown in its position for normal feed stroke operation; and FIG. 2 is a partial view of FIG. 1, showing the device in the position subsequent to an alternative feed stroke operation.

Like reference numerals denote like parts in both views of the drawing.

With the foregoing objects in view, the invention involves generally the provision of a pair of reciprocating feeding devices arranged to act on the workpiece to be fed, each of said devices including its own rotary-to-oscillating motion conversion means with means to operate the oscillating members thereof, serving to operate said feeding devices, in synchronism. With one of the conversion means designed to provide a fixed relatively large work feed stroke and with the other conversion means designed to provide a fixed relatively small work feed stroke, the work being operated on by both oscillating members will be fed with the larger stroke as a result of the greater feeding speed involved, compared with the small feed stroke operation. There is prevented in this manner interference of the smaller feed stroke operation on the larger feed stroke operation.

In order to effect the feeding with the smaller feed stroke, the larger feed stroke operation is temporarily suspended or disabled by disengaging the large stroke feeding means from the workpiece by the actuation of an electrical, pneumatic, hydraulic or the like control device. The utilization of multiple feed devices having different and preset feed strokes in accordance with the present invention makes it possible to substantially instantly change from one to the other feed stroke, as required in continuous production operations, in a manner as will become further apparent as the description proceeds in reference to the drawing.

Referring more particularly to FIG. 1, the continuous or strip-like reinforcing mat is comprised of a set of spaced and parallel longitudinal bars or wires 1 being continuously fed from suitable supply rolls (not shown) and intersected by spaced and parallel transverse bars 2 connected to the longitudinal bars 1 by spot welding by means of a pair of welding electrodes 4 and 5 of a multiple-spot welding machine. The wires 1 are intermittently fed by means of the feeding device according to the invention and the bars 2 applied and welded thereto in a continuous operation or production process.

As pointed out in the foregoing, the present invention involves essentially the provision of at least a pair of work feed devices one of which has a relatively large feed stroke and comprises, in the example shown, a number of work engaging pawls or hooks 3 supported by a plate or carrier 6 which is in turn supported by a slide 7. The latter is operated by a source of rotary power or motor 20 through a rotary-to-oscillating motion conversion device in the form of a crank mechanism comprising an oscillating arm 9 pivoted at its lower end 10 upon a bracket or bearing 11 being supported by the base plate 12 of the device, said arm carrying at its upper end a coupling pin 13 engaging the slot 38 of a fork 8 fast on the slide 7, whereby to reciprocate the latter with a predetermined main feed or operating stroke $a$.

The motion conversion device further comprises a crank disk 17 driven by the motor 20 through a belt 19, said disk being fitted with a projecting pin 14 slidable within a longitudinal guide slot 15 of the arm 9. As a consequence, rotation of the disk 17 through a full revolution results in the arm 9 being oscillated back and forth over a predetermined angle $\alpha$, to advance the slide 7 and with it the mat 1, 2 through a distance equal to the feed stroke $a$, the latter depending upon the radial distance $r_1$ between the center of the disk 17 and its crank pin 14.

Crank pin 14 is advantageously adjustable relative to the disk 17, to control or set the oscillating angle $\alpha$, and in turn the feed stroke $a$ of the slide 7. Mechanism for the adjustment of the pin 14 or distance $r_1$ is well known and not shown for simplicity of illustration and as being immaterial as far as the operation of the invention is concerned. In a similar manner, the plate or carrier 6 of the pawls 3 may be adjusted relative to the slide 7, to set the starting position of the pawls in reference to the feeding movement, this also being well known and not specifically shown by the drawing. Crank disk 17 is supported by a rotating shaft 18 which may be driven by the motor through a chain and pulley drive or any other transmission means.

The mechanism described in the foregoing is designed to feed the mat 1, 2 with a stroke $a$ with the hooks or pawls 3 advantageously engaging the last welded transverse bar 2 by the proper synchronization of the intermittent feed movements or cycles with the welding device proper, in a manner readily understood.

In order to temporarily reduce, in accordance with the concept and purpose of the invention, the feed stroke from its normal value $a$ of say 200 mm.–250 mm., to a fractional stroke $b$ of say 25 mm.–50 mm., there is provided a second feed pawl, slide and rotary-to-oscillating motion conversion device being similar to the afore-described device and comprising, in the example shown, a drive shaft 21 carrying a crank disk 20 fitted with a crank pin 23 sliding in the longitudinal slot of an oscillating driving arm 25 corresponding to the arm 9 of the first conversion device.

In contrast to the motion conversion device of the first feeding device, the crank pin 23 rotates within a circle having a radius $r_2$ equal to a fraction of the radius $r_1$, whereby to result in a correspondingly reduced oscillating angle $\alpha_2$ and in turn in a reduced feed stroke $b$ of the second feeding device, as will be further understood from the following. The oscillating arm 25 is pivoted at its lower end, in a manner similar to the arm 9, about a pivot shaft 26 supported in a bearing mounted upon the base plate 12, the opposite end of arm 25 carrying a coupling pin 30 engaging the slot 38 of a fork 31 carried by the slide 32 of the second feeding device displaced from the first feeding device in the feeding direction. Slide 32 carries feed pawls 33 for effecting the reduced feed movement of the mat 1, 2, or equivalent workpiece being operated on. Both the crank pin 23 and pawls 33 may be adjustable in the manner described for the setting of the feed stroke and the starting position of the pawls, respectively.

An important design feature of the conversion device for the second feeding device of reduced operating stroke $b$ resides in the synchronization of the drive shaft 21 with the shaft 18 of the conversion mechanism of the first feeding device. Synchronized operation of shafts 18 and 21, or disks 17 and 22, respectively, is achieved, in the example shown, by a chain 27 engaging toothed pulleys 28 and 29 being of like effective diameter and fast on shafts 18 and 21, respectively. Any equivalent synchronous drive for the second feeding device may be provided for the purpose of the invention, as is understood.

In operation, with the feed pawls 3 and 33 engaging different transverse bars 2 as shown in FIG. 1, feeding will be with the greater of the feed strokes $a$ with the feeding speed varying sinusoidally, in such a manner that the highest speed or zero acceleration obtains midway within the feed advance movements and that the speed becomes zero at the end of the stroke. The same conditions of speed and acceleration apply to the feeding device of reduced stroke $b$.

Due to the synchronous operation of shafts 18 and 21, the angular speeds of said shafts and, in turn, of the crank disks 17 and 22 are alike. As a consequence, the horizontal feeding speed of both reciprocating feeding devices or slides 7 and 32 are derived from a common angular speed of the drives, whereby the translatory speed at each point of the stroke $a$ exceeds the speeds within the feed stroke $b$. As a consequence, interference upon the feed movement within the main stroke $a$ by the feed movement within the stroke $b$ is substantially prevented.

In order to set the feed mechanism for operation with the reduced feed stroke, suitable control means are provided to temporarily disable the operation of the main feeding device. For this purpose, the pawls 3 are temporarily disabled or disengaged from the cross bar 2. Thus, in the example shown, the pawls 3, possessing a certain elasticity, may be connected, through screws 37 or the like, to the carrier plate 6 such as to be normally in a depressed or disengaged position from the bars 2. The pawls are operated to and maintained in the operative position shown by the piston rod 35 of a pneumatic or hydraulic cylinder or actuator 34 engaging a recess 36 in the underside of the pawls, said cylinder being connected with the slide 7 in any suitable manner. Other means to temporarily disengage the pawls 3 from the rods 2 will readily suggest themselves to those skilled in the art. Operation of the piston 34 in a downward direction will result in the pawls to be disengaged from the mat 1, 2, whereby to result in a feeding of the mat with the reduced stroke $b$, as shown in FIG. 2. The continuous mat may then be cut at a point midway within section $b$, to result in mats of desired or standard size with a minimum projecting length beyond the outermost transverse bars. In FIG. 2, the feed pawls 3 are omitted, this being the equivalent of a retraction or disabling of the main feed device of FIG. 1. In place of a hydraulic or the like control device, equivalent, in particular electrical control means, may be utilized, for temporarily disengaging the pawls from the transverse bars.

In the foregoing the invention has been described in reference to a specific exemplary device or embodiment. It will be evident, however, that variations and modifications, as well as the substitution of equivalent parts or devices for those shown herein for illustration, may be made without departing from the broader scope and spirit of the invention.

I claim:
1. Work feeding apparatus comprising in combination:
 (1) first reciprocating feeding means having workpiece engaging means, to feed a workpiece in a predetermined direction,
 (2) second reciprocating feeding means engaging said workpiece, to feed the same in said predetermined direction,
 (3) first oscillating drive means operably connected with said first feeding means,
 (4) second oscillating drive means operably connected with said second feeding means,
 (5) a source of rotary power,
 (6) first crank means operably connecting said source with said first drive means, to operate said first feeding means with a first predetermined feed stroke,
 (7) second crank means with means to operate the same in synchronism with said first crank means,
 (8) said second crank means operably connected with said second drive means and designed, to operate said second feeding means with a feed stroke being a fraction of said first feed stroke, and
 (9) control means to temporarily disable said workpiece engaging means of said first feeding means.

2. Work feeding apparatus as claimed in claim 1 for feeding a grid-like workpiece comprised of a set of spaced and parallel longitudinal bars intersected by a set of spaced and parallel transverse bars connected to said first set at the intersection points of the bars, wherein said feeding means are comprised of a pair of slides carrying feed pawls each engaging a different transverse bar of said workpiece, and said drive means are comprised of a pair of oscillating arms pivoted at one end and having opposite fork-shaped ends engaging coupling pins carried by the respective slides.

3. Work feeding apparatus as claimed in claim 1, wherein said drive means are comprised each of an oscillating arm pivoted at one end and having opposite fork-shaped ends engaging coupling pins carried by the respective feeding means, and wherein each of said crank means is comprised of a rotating disk carrying a crank pin projecting therefrom and slidably engaging a longitudinal guide slot of the respective oscillating arm.

4. Apparatus for the intermittent feeding of steel mats, each being comprised of a set of spaced and longitudinal bars intersected by a set of transverse bars connected to said first set at the intersection points of the bars, comprising in combination:
 (1) a first reciprocating slide carrying first fed pawls engaging a first transverse bar of a mat to be fed in a predetermined direction,
 (2) a second reciprocating slide carrying feed pawls engaging a transverse bar of said mat different from and spaced from said first bar in the feeding direction,
 (3) a first oscillating driving arm pivoted at one end and having its opposite end operably connected with said first slide,
 (4) a second oscillating driving arm pivoted at one end and having its opposite end operably connected with said second slide,
 (5) a source of rotary driving power,
 (6) first crank means operably connecting said source with said first arm, to operate said first slide with a first predetermined feed stroke,
 (7) second crank means including means to rotate the same at equal angular speed as said first crank,
 (8) said second crank means operably connected with said second arm and designed to operate said second slide with a stroke being a fraction of said first feed stroke, and
 (9) means to temporarily disengage said first pawls from said mat.

5. Feeding apparatus as claimed in claim 4, each of said crank means being comprised of a rotating disk having a crank pin projecting therefrom and slidable in a longitudinal guide slot of the respective oscillating arm, the crank pin of the disk of said second crank means having a distance from the center of said disk less than the distance of the crank pin of the disk of said first crank means from its respective center.

6. Feeding apparatus as claimed in claim 4, said last means being comprised of supporting means for said pawls normally maintaining the same in operative engagement with said mat and operable to a retracted position of disengagement from said mat, and control means to operate said pawls between said engaged and disengaged positions, respectively.

7. Work feeding apparatus comprising in combination:

(1) first reciprocating feeding means including workpiece engaging means, to feed a workpiece in a predetermined direction,
(2) second reciprocating feeding means engaging said workpiece, to feed the same in said predetermined direction,
(3) a source of rotary driving power,
(4) first rotary-to-oscillating motion conversion means operably connecting said source with said first feeding means, to operate the same with a first predetermined feed stroke,
(5) second rotary-to-oscillating motion conversion means for and designed to operate said second feeding means with a feed stroke being a fraction of said first feed stroke,
(6) means to operate said second conversion means in synchronism with said first conversion means, and
(7) control means to temporarily disable said workpiece engaging means of said first feeding means.

References Cited

UNITED STATES PATENTS 3,051,361    8/1962    Menkel _____ 226—67 X
3,403,831    10/1968    Lawson _____ 226—116 X M. HENSON WOOD, JR., Primary Examiner R. A. SCHACHER, Assistant Examiner U.S. Cl. X.R.

198—221; 226—62, 67, 115, 161